M. DUBOWIK.
GAUGE.
APPLICATION FILED MAR. 24, 1921.

1,411,685.

Patented Apr. 4, 1922.

Inventor
Mikolaj Dubowik
By his Attorney
George C. Heinrick

UNITED STATES PATENT OFFICE.

MIKOLAJ DUBOWIK, OF WORCESTER, MASSACHUSETTS.

GAUGE.

1,411,685.  Specification of Letters Patent.  Patented Apr. 4, 1922.

Application filed March 24, 1921. Serial No. 455,111.

*To all whom it may concern:*

Be it known that I, MIKOLAJ DUBOWIK, a citizen of Poland, residing at Worcester, county of Worcester, and State of Massachusetts, have invented certain new and useful Improvements in Gauges, of which the following is a specification.

The invention relates to improvements in micrometer gauges, and it is the principal object of the invention to produce a device of this character which is adapted for the simultaneous measurement of round stock as well as of flat stock.

It is a further object of the invention to provide an instrument of this character, the movable jaw of which is operated by means of a screw provided with an operating handle laterally projecting from the instrument.

A further object of the invention is the provision of an instrument of this type which is of simple and inexpensive construction and convenient to manipulate.

These and other objects of the invention will become apparent as the description thereof proceeds and will then more specifically be pointed out in the appended claims.

In the accompanying drawing, forming a material part of this disclosure—

Figure 1:
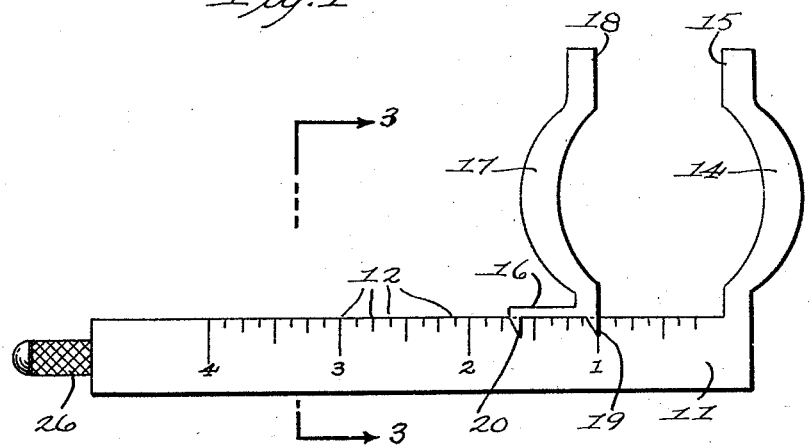
Figure 1 is a side view of an instrument constructed according to my invention.
Figure 2:
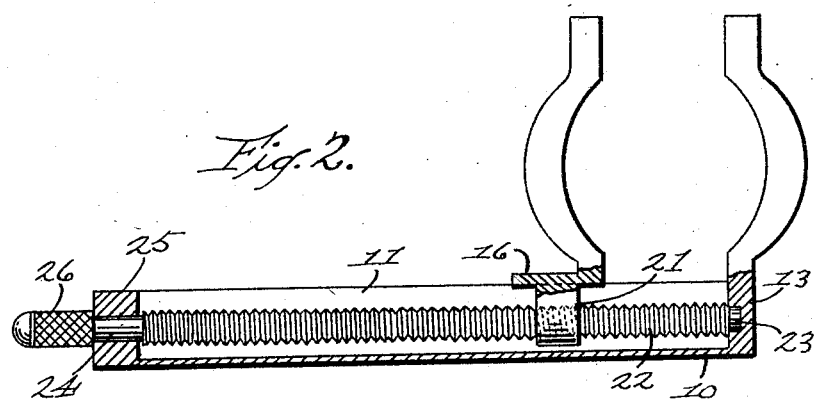
Figure 2 is a similar view after the removal of the scale bearing side wall.
Figure 3:
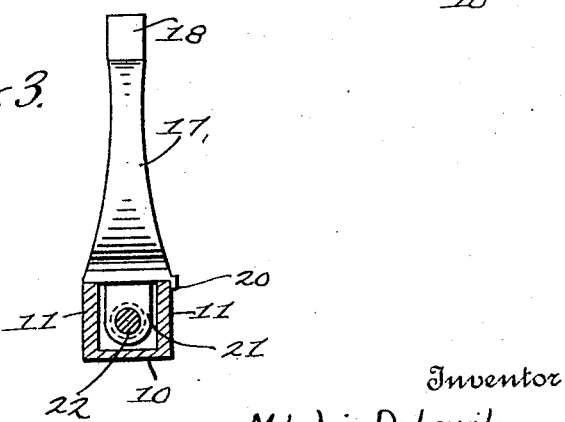
Figure 3 is a transverse section through the instrument along line 3—3 of Figure 1.

The sides 10 of a casing 11 of any suitable material as for instance metal, bear a scale 12 and at its rear a jaw 13 is integrally made with the casing and projecting upwardly therefrom to form a rounded cheek part 14, and an upper straight part 15.

The movable jaw 16 has a foot part adapted to slide with its under side along the upper edge of the casing 10, and has a rounded cheek part 17 corresponding to the cheek 14 and also an upper straight part 18 corresponding to the straight part 15.

Integral with the foot part of the movable jaw indicating fingers 19 and 20 are constructed, in spaced relation, one, 20 at the outer end of the foot part and the other, 19 at the inner end thereof, both fingers adapted to be moved over the scale 12.

The finger 19 constituting the means for indicating the measurements for flat stock and the finger 20 a means for the measurements of round stock.

To the foot part 16, within the casing 10 is secured, or integrally made therewith, an annular socket 21 provided with inner screw threads through which a screw spindle 22 is guided, journaled with one end as at 23 in the foot part of jaw 13, while its other end is smooth as at 24 and is extended through the end wall 25 of the casing on the outside of which it is formed with a milled handle 26.

The operation of the device will be evident from the foregoing description, as illustrated in Figure 1, the movable jaw has been set to indicate with its finger 20 a measurement for round stock of 1⅝ inches, while the finger 19 of the jaw indicates a measurement for flat stock of 1 inch.

It will be clear that changes may be made in the general arrangement, combination of elements and the construction of the minor details of my invention without departing from the scope and spirit thereof.

What I claim as new and desire to protect by Letters Patent of the United States is—

1. An instrument of the character described, comprising a rectangular elongated casing said casing having a scale, a stationary jaw integral with said casing and forming with its foot part the end wall thereof, a rounded cheek part and an upper straight part on said jaw, and a movable jaw adapted to slide with its foot along the upper edge of said casing, also comprising a rounded cheek and an upper straight part corresponding to the rounded jaw and straight part of said stationary jaw, a means for imparting to said movable jaw a reciprocating motion with respect to said stationary jaw, and indicating means on said movable jaw for indicating on said scale simultaneously the distances between the flat portions and the curved portions of the jaws.

2. An instrument of the character described, comprising a casing provided with a scale, a stationary jaw integral with said casing, a movable jaw having a foot part adapted to move along the upper edge of said casing, a pair of indicating fingers on said movable jaw adapted to move over said scale, a screw threaded socket in said casing integral with said movable jaw, a screw longitudinally disposed in said casing journaled with one end in the foot part of said stationary jaw, and having a smooth part projecting at the opposite end from said casing, a milled handle on the end of said screw projecting from the casing, for operating the movable jaw to indicate with its fingers on the scale on said casing simultaneously to distances between the flat portions and the curved portions of the jaws.

In testimony whereof I have affixed my signature.

MIKOLAJ DUBOWIK.